UNITED STATES PATENT OFFICE.

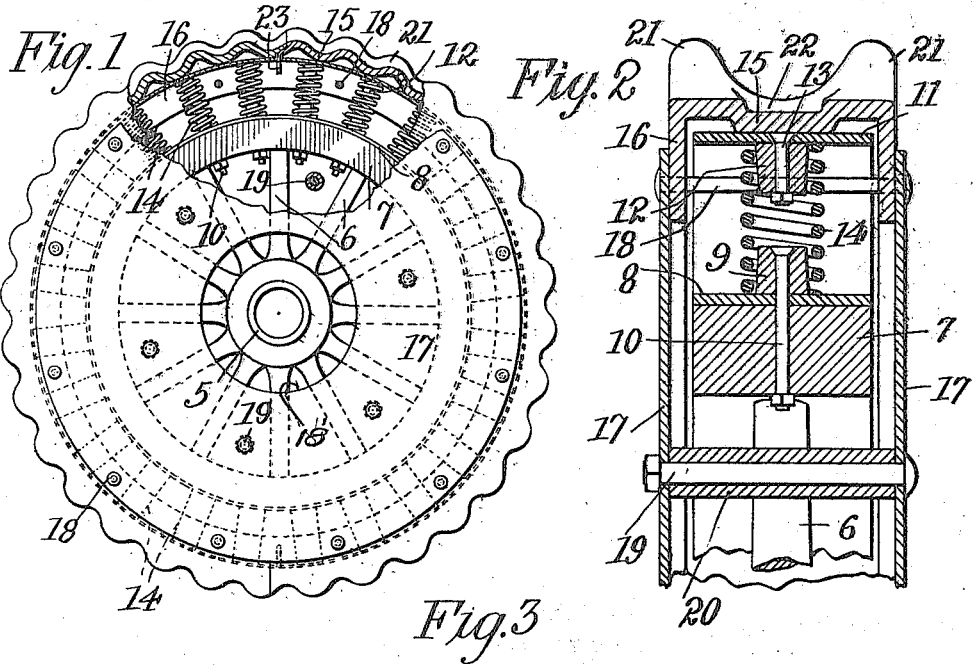
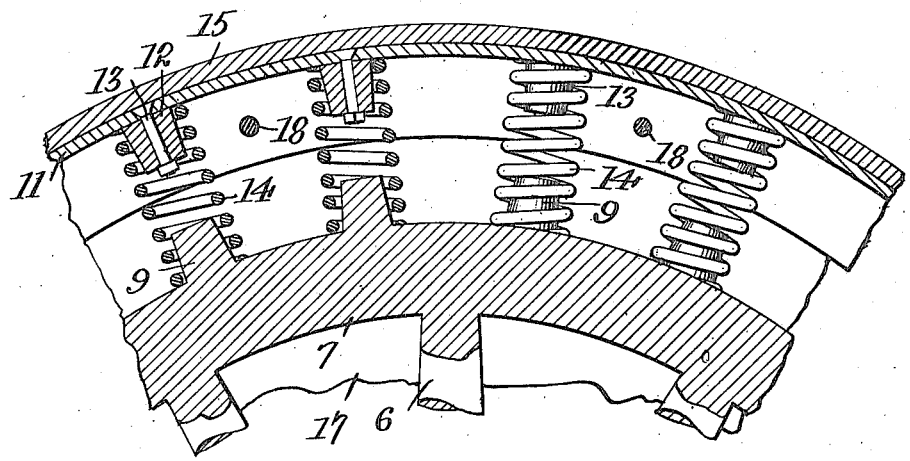
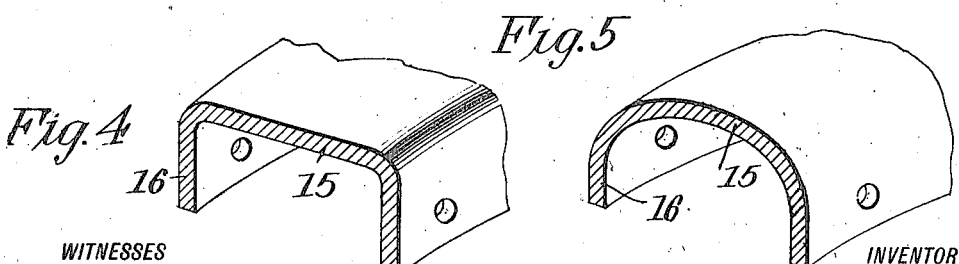

JOHN J. ZIPAY, OF SANDCOULEE, MONTANA.

RESILIENT WHEEL.

1,148,347.  Specification of Letters Patent.  Patented July 27, 1915.

Application filed June 10, 1914.  Serial No. 844,184.

*To all whom it may concern:*

Be it known that I, JOHN J. ZIPAY, a citizen of the United States, residing at Sandcoulee, in the county of Cascade and State of Montana, have invented a new and useful Improvement in Resilient Wheels, of which the following is a specification.

This invention relates to vehicle wheels, and more particularly to an improved resilient automobile wheel.

One of the principal objects of the invention is to provide an improved wheel having a puncture proof tire, within which is resiliently supported and balanced the wheel hub and adjacent parts.

Another object of the invention is to provide an improved means for preventing the skidding of an automobile or similar vehicle.

A further object of the invention is to provide a wheel of the class described including an inner rim supported on the hub, and an outer rim or tire resiliently supporting the inner rim by means of suitable spring connection between the rims.

With these and other objects in view which will become apparent as the description proceeds, the invention resides in the construction, combination and arrangement of parts, hereinafter more fully described and claimed and illustrated in the accompanying drawing, in which like characters of reference indicate like parts throughout the several figures, to which—

Figure 1 represents a side elevational view, portions being broken away and portions being shown in section, of a wheel constructed according to my invention. Fig. 2 represents an enlarged transverse sectional view taken through a portion of the wheel. Fig. 3 represents a fragmentary longitudinal sectional view taken through a wheel constructed according to my invention. Fig. 4 represents a fragmentary perspective view of a modified form of tire. Fig. 5 represents a view similar to Fig. 4 of a further modified form.

Referring more particularly to the drawings, 5 indicates the hub of the wheel carrying the spokes 6, and 7 indicates the inner rim of the wheel. The spokes and inner rim may be formed of wood, or may as indicated in Fig. 3 be cast in a single piece from suitable metal. Encircling rim 7 is a metallic band 8, having cylindrical lugs 9 positioned on the outer surface thereof and extending radially with respect to the wheel and connected to the band 8 by means of bolts 10 extending through the lugs and through the band, and through the inner rim of the wheel, said bolts serving to maintain both the lugs and band in position on the rim.

Encircling the inner band 8 in spaced relation thereto is an outer band 11, having inwardly projected lugs 12 connected thereto by means of bolts 13, the number and arrangement of lugs 12 being analogous to the number and arrangement of lugs 9, so that all of the lugs are disposed radially with respect to the wheel and occur in pairs around the circumference of the inner rim. Coiled springs 14 are disposed between the bands, and are anchored at their ends over the opposite pairs of lugs in the manner set forth, said springs serving the purpose of balancing and resiliently supporting the inner rim and hub relatively to the outer rim. Said outer rim encircles the band 11, and may be formed of metal or other suitable puncture proof material molded or cast in the form shown in Figs. 1 and 2, or the form shown in Figs. 4 and 5. In any instance the outer rim provides a tread portion 15 and spaced inwardly extending flanges 16, said flanges being spaced apart a distance slightly greater than the width of the outer band, and being disposed on each side of said band.

On each side of the wheel is disposed a circular guard plate 17 provided with a central opening 18′ of greater dimensions than the hub of the wheel, said guard plates being flat, and being connected near their edges to flanges 16 of the outer rims by means of rivet headed bolts 18 which pass through both plates and flanges inwardly of the outer band 11. Inwardly of rim 7 and between the spokes, plates 17 are connected by bolts 19 extending through sleeves 20 which abut at their ends against the inner faces of the plates, for maintaining the latter in spaced relation at all times so as not to interfere with the movement of the inner rim and hub.

The outer rim or tire illustrated in Figs. 1 and 2, provides outwardly extending spaced corrugated or indented flanges 21, occurring on each side of a medial transversely corrugated or waved central portion 22. The rim shown in Fig. 4 provides a flat tread portion while that in Fig. 5 provides a round tread portion similar to the ordinary tread of a pneumatic tire. The outer rim may be made in sections as indicated in Fig. 1, the number of sections of which the rim is composed being optional. The rim is provided at suitable intervals with inwardly projecting lugs 23 indicated in Fig. 1, extending through openings in the outer band 11, to prevent movement of said band relatively to the outer rim.

A wheel constructed in accordance with my invention will be extremely resilient and lively, and will be of greater utility on slippery or muddy roads, and by reason of the arrangement of the springs the weight of a vehicle and the road shocks will be distributed through the springs, thus equalizing the strain in them, and hence equalizing the strain on the wheel parts and enhancing the life of the wheel.

Although I have described the preferred embodiment of my invention, I may desire to make such changes in the construction, combination and arrangement of parts thereof as do not depart from the spirit of the invention and the scope of the appended claims.

I claim:—

1. A wheel comprising a hub, spokes, an inner rim supported by said spokes, an inner band surrounding said inner rim, radially disposed spaced lugs situated on said inner band, bolts extending through said lugs, inner band, and inner rim for connecting them together, an outer band disposed in spaced relation with said inner band, inwardly projecting radially disposed lugs provided on said outer band, bolts extending through the outer lugs and band for securing them together, coiled springs disposed between the inner and outer bands and anchored at their ends over the lugs, an outer rim including a tread portion and spaced inwardly disposed flanges, said outer rim disposed over said outer band, with the flanges in spaced relation to said outer band, guard plates disposed on each side of said wheel and provided with central openings of a larger diameter than the hub, bolts securing the guard plates near their outer edges to the flanges of the outer rim, said bolts extending through said plates and flanges inwardly of the outer band, said rim being formed in sections, and lugs projecting from the rim and through openings in the outer band.

2. A wheel of the class described comprising a hub, spokes, an inner rim carried by said spokes, an inner band surrounding said inner rim, radially disposed lugs situated at spaced intervals on the inner band, means for connecting the lugs to the inner band, said means also connecting said inner band to the inner rim, an outer band sourounding the inner band in spaced relation thereto, spaced radially disposed lugs positioned on the outer band opposite the lugs on the inner band, spring means disposed between said bands and anchored at their ends upon said lugs, an outer rim disposed upon the outer band, and lugs carried by said outer rim and engaging said outer band.

JOHN J. ZIPAY.

Witnesses:
GEORGE S. SABA,
ANDRE C. GREJSAK.